Sept. 22, 1942.　　A. S. McINTIRE　　2,296,476
APPARATUS FOR METERING GAS
Filed July 18, 1938　　3 Sheets-Sheet 1

INVENTOR
Arthur S. McIntire,
BY
ATTORNEY

Patented Sept. 22, 1942

2,296,476

UNITED STATES PATENT OFFICE 2,296,476

APPARATUS FOR METERING GAS

Arthur S. McIntire, Bridgeport, Conn., assignor to The Sprague Meter Company, Bridgeport, Conn., a corporation of Connecticut Application July 18, 1938, Serial No. 219,851

42 Claims. (Cl. 73—281)

This invention relates to apparatus for measuring fluid flow, as in gas meters for example, and particularly concerns mechanisms for utilizing pressure and movement of the gas or fluid to actuate flow governing valves and/or a meter register.

In a type of gas meter in which adjacent measuring chambers are separated by a diaphragm in part flexible and mounted to move back and forth for increasing and diminishing the size of such chambers, it is proposed in United States Patents No. 722,389 of March 10, 1903, and No. 1,892,520 of December 27, 1932, both granted to Henry H. Sprague, to employ a crank mechanism supported to rotate on a fixed axis with pitman links connecting the crank to the flexible diaphragms in a manner to transmit motion from the diaphragms to a plurality of valves controlling the intake and exhaust of gas from the different measuring chambers. If a single valve be used, it may be constructed for operation in accordance with United States Patent No. 722,390, granted March 10, 1903, to said Henry H. Sprague. The same crank mechanism may also transmit motion from the diaphragms to a meter register.

The present improvements particularly concern devices for calibrating the gas meter by adjusting such apparatus and mechanisms in a way to vary the cooperative performance of parts thereof.

In the type of meter referred to, the extent of diaphragm movement determines the volumetric change effected in the capacity of the measuring chamber, and hence determines the volume of gas that will be taken in and exhausted from each measuring chamber during a full excursion of reciprocative diaphragm movement. In the type of crank and pitman-link mechanism referred to, the distance of travel permitted to the diaphragm is determined by the "throw" of the crank. This "throw" is twice the effective length of the "crank arm," or in other words, is twice the radial distance from the axis of the crank to the point of pivotal connection of the pitman link thereto. Hence by adjustively varying this radial distance, and thereby the "throw" of the crank, the extent of back and forth movement of the diaphragm corresponding to one full turn of the crank may be varied. A greater or less volume of gas consequently enters and leaves the measuring chamber or chambers during one full turn of the crank. This expedient is resorted to for calibrating the action of the register whose wheels and dial pointers move proportionately to the rotative travel of the crank.

In meters embodying two such diaphragms and two such pitman links acting jointly and simultaneously upon a single such crank, it has heretofore been the practice to effect calibration by varying the "throw" of the crank in relation to only one of the pitman links and diaphragms. The "throw" of the same crank in relation to the other pitman link and diaphragm has been permitted to remain constant. This method of calibration is practiced at the expense of setting up dimensionally different throws of the crank in relation respectively to the two pitman links and diaphragms. It results in one diaphragm performing a longer excursion of movement than does the other diaphragm and thus necessitates successive discharges of unequal volumes of gas from the different measuring chambers into the service pipe line leading to the point of gas consumption. When the service pipe lines are small, or the demand for gas at the point of consumption is large in relation to the aggregate delivery capacity of the meter, fluctuations of the gas delivery to the point of consumption may result because of some measuring chamber delivering less than its share of gas to the service pipe line.

To insure a full and steady flow of gas through the meter to the point of gas consumption is one object of this invention.

A related object is to provide mechanisms for calibrating a multiple diaphragm meter in a manner to maintain under all conditions, within its designed range of calibration, the successive delivery of equal volumes or charges of gas from all measuring chambers of the meter.

A further object is to provide mechanisms for varying to like extent the distances through which multiple diaphragms are permitted to move while simultaneously linked to a common crank.

A further object is to provide means whereby the adjustive shifting of a single element produces a like change in the effective "throw" of a crank with respect to multiple diaphragms respectively connected to such common crank by separate pitman links.

A further object is to provide means for varying, and preferably to like extent, the radial distances from the axis of a crank to a plurality of circumferentially spaced crank pins or like pivotal devices carried thereby while such devices are engaged respectively by a plurality of pitman links whose paths of swinging travel relatively overlap.

A further object is to provide mechanisms for varying, and preferably to like extent, the radial distances from the axis of a crank to a plurality of circumferentially spaced crank pins or like pivoted devices carried thereby and engaged respectively by pitman links whose paths of travel would be intersected by an elongation of the axis of the crank.

A still further object of these improvements is to provide more rugged and positive means for securing the crank rigidly upon its shaft in adjustable rotative relation thereto than is disclosed in the said Patent No. 1,892,520. This is for the purpose of coordinating, or "timing" the action of the valves which control the gas inlets to the measuring chambers in relation to the action of the flexible diaphragms.

The above and related objects are explained in greater detail in the following description of methods, structures and function by which they may be accomplished, in which description reference is had to the accompanying drawings, wherein.

The meter as a whole is comprised of a casing structure 11 forming the usual three measuring chambers 12, 13 and 14, a distributing chamber 15 and an exhaust chamber 16. Gas from the mains passes into the distributing chamber through piping connection to the mains at 17 and passes out of the exhaust chamber 16 through connection of service pipe at 18.

A centrally hollowed-out valve disc 19 travels in sliding contact with the smooth top edges of cloverleaf partitions 20 in a manner successively to open and close separate passageways 12ª, 13ª, and 14ª between the distributing chamber 15 and measuring chambers 12, 13 and 14, respectively. By aid of its central hollow portion 23, this valve disc in its sliding movement also opens and closes communication between the said passageways and a central well 21 which communicates through passageway 22 with the exhaust chamber 16. By this action of disc 19 the flow of gas into and out of the three measuring chambers is governed in proper timing and sequence to cause reciprocative excursions of the usual two flexible diaphragms 24 and 25 in a manner that is more fully described in the aforesaid Patent No. 722,390.

Disc 19 further carries an upstanding projection 26 which impels the radial arm 27 of the register mechanism, not here shown in further detail, but which is located for the most part in the offset housing 28 at the front of the top portion of the meter.

The interior bottom end of the disc projection 26 is hollow and is pivotally engaged by the upstanding driving pin 29 which is carried by an arm 29ª fast to the vertical crank shaft 30. This shaft is journaled in a vertical bearing bracket 31 which penetrates, depends from and is rigidly but removably mounted in a central portion of the roof wall 32 of the central measuring chamber. A thrust collar 44 fixed to shaft 30 above bracket 31 supports the weight of the shaft and its carried parts, by seating on the smooth top end of bearing bracket 31 in a manner to prevent fluid communication between well 21 and measuring chamber 13.

Figure 1:
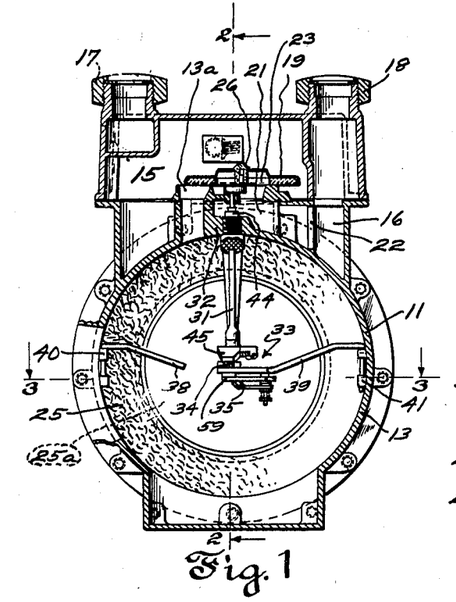
Fig. 1 is a view in front elevation taken in central vertical section through a gas meter of the Sprague type embodying the present improvements.
Figure 2:
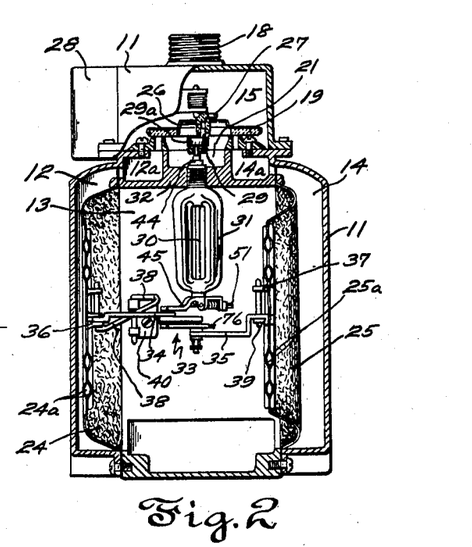
Fig. 2 is a view in side elevation showing the casing and certain contained parts in section on the plane 2—2 in Fig. 1 looking in the direction of the arrows.
Figure 3:
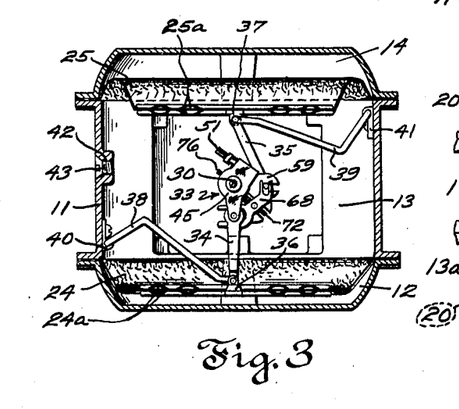
Fig. 3 is a plan view showing the casing and certain contained parts in section on the plane 3—3 in Fig. 1.
Figure 4:
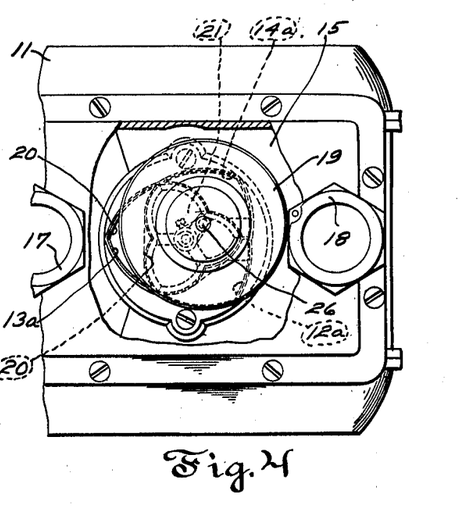
Fig. 4 is a fragmentary plan view of the meter with the roof wall of the distributing chamber broken away to show the valve controlled inlets and outlets for the measuring chambers.
Figures 10, 13, 14:
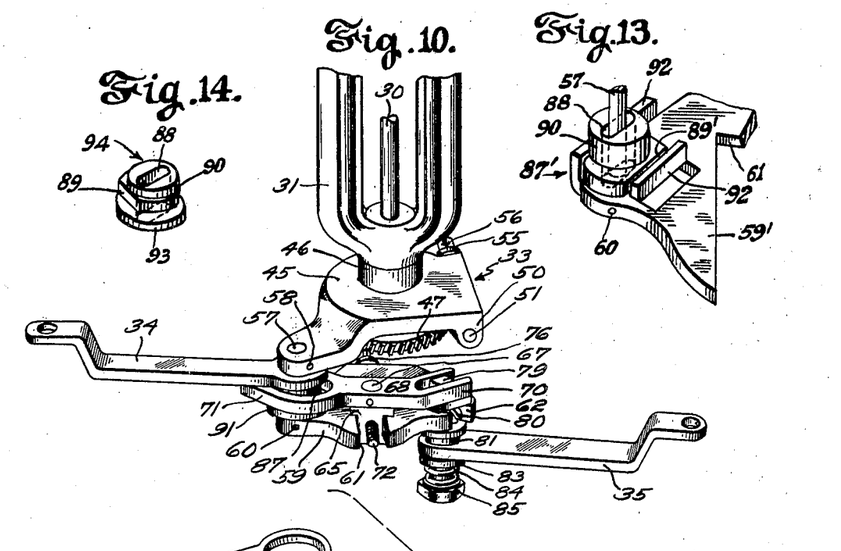
Fig. 10 is a perspective view of the assemblage of parts shown in Figs. 5 and 6.
Fig. 13 is a fragmentary perspective view of a modified construction for guiding an adjustable crank pin device in a definite straight path.
Fig. 14 is a perspective view showing a modified construction of one of the parts in Fig. 11.

The lower end of crank shaft 30 projects below the bottom of bracket 31 and carries thereat a crank arm structure indicated as a whole by 33 and shown most fully in Fig. 10 to comprise a double crank rotor having two webs axially spaced by a fixed stud or crank pin hereinafter referred to. This crank arm structure is pivotally connected by pitman links 34, 35 to diaphragms 24 and 25 as best shown in Figs. 1, 2 and 3, wherein the central portions of the diaphragms are seen to include disc-like plates 24ª and 25ª clamping between them the flexible leather of the diaphragms and carrying respectively the hinge brackets 36 and 37. As in older patented constructions of the Sprague meter, and for steadying and guiding each diaphragm in a fixed path of back-and-forth movement, the hinge brackets 36 and 37 are movably guided respectively by bent-rod arms 38 and 39 swingably mounted respectively in stationary hinge brackets 40 and 41 secured to walls of the casing structure within the central measuring chamber.

The before mentioned pitman links 34 and 35 have their diaphragm-connecting ends pivotally coupled with the diaphragm-carried hinge brackets 36 and 37, respectively, and their opposite ends are pivotally coupled with the crank structure 33. Important features of the crank structure 33, as operatively related to the pitman links 34, 35 and to the shaft 30, are novel with this invention.

The crank structure 33 includes as one web a holding arm 45 whose hub 46 has a rotatively adjustable fit upon shaft 30 below bracket 31, and is retained thereon by a worm wheel 47 fixedly secured to the bottom end of the shaft by pin 48. Two spaced lateral lugs 49 and 50 form rigid projections from the hub 46 and give bearing to an adjusting pin 51 on which is fixed the worm 52 in mesh with worm wheel 47. Worm 52 and its loose thrust washer 53 fill the space between lugs 49 and 50, while friction to prevent accidental turning of pin 51 is provided by a compression spring 54 bearing between lug 49 and the head flange 55 of the adjustor pin. The head 56 of this pin is squared for the application thereto of a socket wrench or other suitable adjustor tool which may be inserted through the aperture 42 in the casing wall best shown in Fig. 3 after the gas tight screw plug 43 has been removed. The engagement of worm 52 with worm wheel 47 affords a rugged means for making minute changes in the rotative relation of holding arm 45 and shaft 30 for properly synchronizing the opening and closing of the ports or passageways as controlled by the movement of disc 19 in relation to the excursions of movement performed by the diaphragms.

All of the rest of the crank structure is suspended in rigid and spaced relation to holding arm 45 by means of the vertical post or fixed crank-pin 57 whose top end may tightly fit a hole in the extremity of arm 45 and is held therein by a pin 58 extending through the post and through the arm. Other suitable means for making post 57 fast to arm 45 may be employed. The lower end of post 57 is in similar fashion held tightly within a hole in one corner of the crank plate 59 which forms the other web of the double crank by pin 60. By this or equivalent constructions, the crank plate 59 is at all times carried as rigidly and immovably in spaced relation to the holding arm 45 as though these two parts formed an integral structure.

Figures 5, 6, 7, 8, 9:
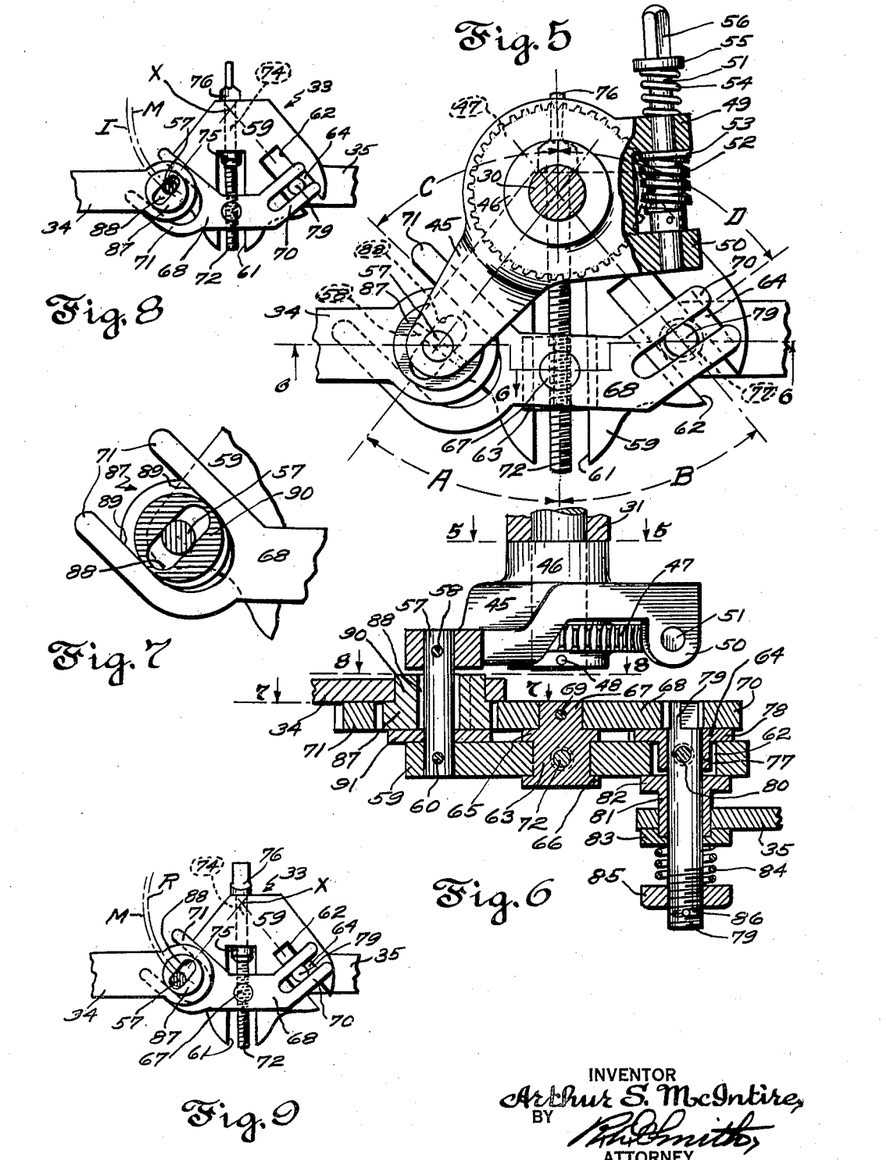
Fig. 5 is a greatly enlarged view of the improved adjustable linkage mechanism looking downward from the plane 5—5 in Fig. 6.
Fig. 6 is an edgewise view of the parts shown in Fig. 5 taken in section on the planes 6—6 in Fig. 5 looking in the direction of the arrows.
Fig. 7 is a fragmentary plan view taken in section on the plane 7—7 in Fig. 6.
Fig. 8 is a plan view drawn on a reduced scale showing the parts in section on the plane 8—8 in Fig. 6 readjusted in a manner to increase the "throw" of the crank.
Fig. 9 is a view similar to Fig. 8 showing the parts readjusted to reduce the "throw" of the crank.

Crank plate 59 is provided with angularly related elongated cut-outs 61 and 62 whose opposite edges form guideways along which the blocks 63 and 64 may respectively be moved. Block 63 is square and provided with an enlarged, square head flange 65 and a similarly enlarged foot-flange 66. Block 63 further carries an upstanding cylindrical stud 67 which engages a hole in the central portion of an adjustor yoke 68 to which the stud 67 is fixedly secured by a pin 69. The yoke 68 has a narrow forked end 70 and a wide forked end 71. Block 63 together with its fixedly carried yoke 68 is held at selective stations lengthwise of cut-out 61 by the adjustor screw 72 whose length, which occupies this cut-out, has threaded engagement with a hole 73 in the block. The unthreaded portion 74 of the length of screw 72 which passes through the crank plate 59 is journaled therein and prevented from moving lengthwise in relation to the crank plate by the thrust collar 75 which is fast to the screw and by the enlarged screw adjusting head 76. The terminal portion of screw head 76 is flatted, or if preferred, may be squared, to receive and be adjustively turned by the same wrench or other suitable tool which is used to turn the worm adjusting pin 51. In Fig. 5 it will be noted that the axes of adjustor pin 51 and adjustor screw 72 extend in the direction of casing opening 42 in order that both may be reached for adjustment when the crank structure is in a given position.

The slide block 64 comprises a hollow cylindrical shank 77 having a sliding fit in the cut-out 62 of the crank plate and a square head-flange 78 of larger dimensions. The adjustable crank pin 79 is rigid with slide block 64 tightly fitting the hollow shank 77 thereof and being secured thereto by a cross pin or removable fastening screw 80 which may penetrate through the crank pin 79 and both cylindrical walls of the shank 77. The top end of crank pin 79 projects above the head flange 78 and is thereat slabbed for snug but free sliding engagement with the forked end 70 of yoke 68. The length of shank 77 is slightly less than the thickness of crank plate 59 for a purpose that will appear.

Beneath crank plate 59, the adjustable crank pin 79 carries a sleeve 81 slidable lengthwise thereof and having the enlarged, square head-flange 82 which is urged upwardly against the bottom surface of crank plate 59 by the pressure of a compression spring 84 confined around pin 79 between a terminal nut 85 and a thrust washer 83, the latter being centrally recessed to receive and fit the bottom end of sleeve 81. Nut 85 has threaded engagement with the pin and is prevented from working loose by the cotter pin 86. The shortness of shank 77 in relation to the thickness of crank plate 59 is now seen to permit spring 84 to squeeze the crank plate between head flanges 78 and 82 and thus maintain an adjustable frictional resistance to sliding movement of block 64 along notch 62, which resistance helps to insure that the crank pin will remain undisturbed in any position to which it is shifted by the adjustor yoke 68. One end of pitman link 35 is pivotally engaged with the sleeve 81 so that the radial distance from the axis of rotation of the crank structure to the point of pivotal connection of link 35 varies with the adjustive movement of block 64 along the plate cut-out 62.

The objective of correspondingly and by a common means causing a similar variation to take place in the radial distance from the axis of rotation of the crank structure to the point of pivotal connection of pitman link 34 thereto, gives rise to mechanical problems. The two pitman links 34 and 35 revolve and swing in overlapping paths of travel and in paths of travel which are intersected by the projected axis of rotation of the crank structure. Hence link 34 must travel in a plane intermediate the holding arm 45 and the crank plate 59, for if link 34 traveled above arm 45 it would be intercepted by shaft 30 and if it traveled below plate 59 it would encounter the revolving crank pin 79. But all planes located between holding arm 45 and crank plate 59 are swept by the fixed crank pin or post 57, which is depended upon to hold arm 45 and plate 59 in absolutely fixed and rigid relation. For this reason it is undesirable to make the post 57 itself radially adjustable with respect to arm 45 or crank plate 59 as to its radial distance from the pivotal axis of the crank structure.

Figures 11, 12:
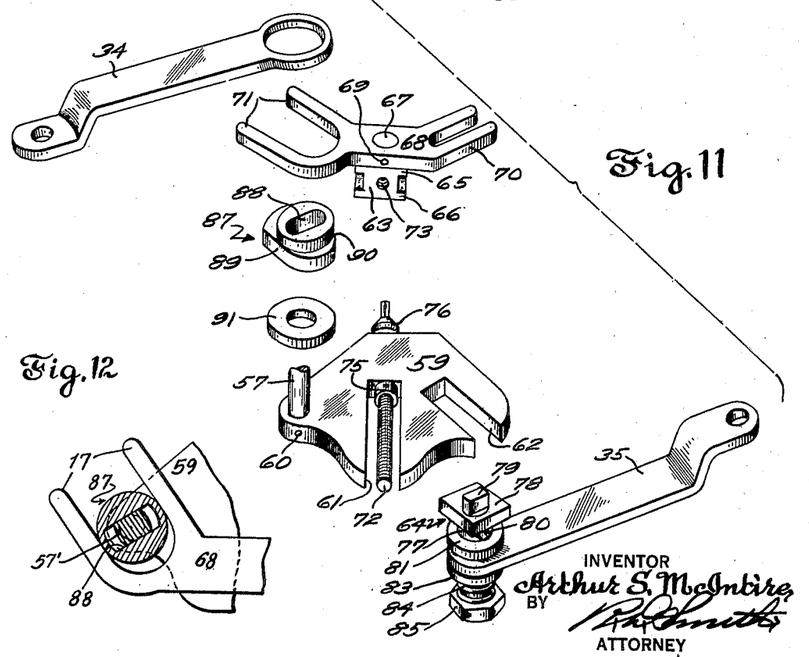
Fig. 11 is an exploded perspective view of certain of the parts of Fig. 10.
Fig. 12 shows a modified form of fixed crank pin and is otherwise similar to Fig. 7.

The wider forked end 71 of yoke 68 is therefore arranged to straddle and slidingly fit a shiftable collar 87 which functions as the second or shiftable "crank pin." Collar 87 has the elongated slot 88 extending completely through it and post 57 extends through this slot, being of cross sectional size to fill the width of the slot and thereby to permit lateral sliding of collar 87 relative to the post only in the direction in which the slot extends. When a circular post is used, as shown in the drawings, the portion of the length of collar 87 which engages with the forked end 71 of yoke 68 is shaped to provide the flat sides 89 which slidingly fit the forked end 71 of the yoke and hold the collar 87 from rotating. Thus the slot 88 is maintained in designed alignment relative to the axis of rotation of the crank structure. This can be accomplished in other ways, as by making the post 57' of flat sided cross sectional shape, as shown in Fig. 12, so fitting the width of the slot 88 that the straight edges of this slot will be constrained to sliding movement in a fixed direction by the said cross sectional shape of the post alone. In this case, the terminal portion of yoke 68 which engages collar 87 need not be forked nor depended upon to determine the alignment of slot 88, and the flat sides 89 on collar 87 may be omitted. Collar 87 may otherwise be prevented from turning about post 57, while arranged to slide crosswise thereof, by any suitably constructed guideways such as 92 in Fig. 13 carried by crank plate 59' and properly engaging a flat side or sides or other straight line element incorporated in the structure of collar 87'.

The pitman link 34 pivotally engages the cylindrical portion 90 of collar 87 and the collar as a whole may be separated from the crank plate 59 by a spacer washer 91 surrounding post 57 and which is larger in diameter than the distance between the flat sides 89 of collar 87 and of thickness equaling the thickness of flanged heads 65 and 78 of blocks 63 and block 64, respectively. The wide forked end 71 of yoke 68 may thereby obtain additional support from washer 91 as the narrow forked end 70 derives corresponding support from the head flange 78 of block 64 enabling the yoke to comprise a light weight plate of uniform thickness. If preferred, the spacer washer 91 may be replaced by a footflange 93 of corresponding size formed as an integral part of the collar 94 in Fig. 14.

The operation of the crank structure parts is as follows:

The adjustable crank pin devices comprising collar 87 and the assemblage of parts 64, 79, 81, 83, 84 and 85, are alternately pushed and pulled by the pitman links 34 and 35 cooperatively in a manner to rotate the crank structure 59, 57 and 45. This rotates shaft 30 and its eccentrically carried drive pin 29 which causes the valve disc 19 to sweep across the top edges of the cloverleaf partitions 20 in a manner to permit different portions of the disc surface at different times to sweep past a given point on the edges of the partitions 20 thus avoiding abrasion of surfaces such as can result from confining a sliding valve surface to a fixed path of travel. This action of valve disc 19 opens up and cuts off fluid communication between the distributing chamber 15 and the passageways 12ª, 13ª and 14ª leading to measuring chambers 12, 13 and 14, respectively, and also between these same measuring chambers and the central well 21 having outlet to the exhaust chamber 16 through 22, in proper sequence and timed relationship to cause gas pressure to be exerted successively in proper directions on the diaphragms 24 and 25 for operating the pitman links. At the same time, the central disc projection 26 impels the radial arm 27 in a manner to drive the register mechanism.

If upon test of the meter in operation, the valve disc 19 is found to be opening and closing the gas passageways to the measuring chambers in improperly timed relation to the movement of the diaphragms, the screw plug 43 is removed from its hole 42 in the wall of the meter casing and a tool is inserted through this hole adapted to reach and turn the worm adjusting pin 51 while in true axial alignment therewith. Through the action of worm 52 and the worm wheel 47 this will change the rotative relation of support arm 45 to shaft 30 to a degree that may be controlled finely in either desired direction. Adjustment of pin 51 is maintained by pressure of spring 54 when the valve disc movement has been brought into correctly timed relation to the movements of the diaphragms. Even without spring 54, the worm 52 is seen to afford substantially a lock for maintaining any rotative relationship into which shaft 30 and arm 45 are adjusted thereby.

If upon comparison of the register reading with a standard it is found that the indication is incorrect for the true amount of gas which has passed through the meter, the same tool may be employed in the same manner to turn the adjustor screw 72 while in true axial alignment therewith. This will slide the block 63 and its carried yoke 68 toward or away from the axis of shaft 30 while the bifurcate ends 70 and 71 of the yoke will simultaneously move the adjustable crank pin devices 87 and 79, respectively, toward or away from this same axis of the crank structure. The distance through which each diaphragm moves will thus be varied yet the shaft 30 will continue to perform one revolution while either diaphragm performs its full excursion of reciprocative movement. Hence the volume of gas passed through the meter during a given travel of the register is made greater or less and the meter in this manner may be calibrated as desired.

With particular reference to Figs. 5 and 6, I may refer to the angle A plus B as the crank angle, or that angle which separates the centers of swinging movements of links 34 and 35 along the crank path or paths of revolving travel of said centers. It will be observed that if the parts are so constructed and related that the angle A, say 40 degrees, (between the line of adjustive movement of crank pin device 87 and the line of adjustive movement of yoke 68) exactly equals the angle B (between the line of adjustive movement of crank pin device 79 and said line of movement of the yoke), the two bifurcate ends of the yoke will cause like amounts of movement of both of these crank pin devices toward or away from the projected axis of rotation of the crank structure, providing that angle C, say 50 degrees, (which the guiding edge of one end of the yoke makes with the line of adjustive movement of the yoke) exactly equals the angle D (which the guiding edge of the other end of the yoke makes with said line of adjustive travel of the yoke). The drawings illustrate that if desired, the yoke may be carried by its slide block 63 in positions slightly departing from the relationship of angles above specified. This is possible because of its mounting upon the cylindrical stud 67, to which it may be pinned at angles of slight obliquity for special purposes. Preferably the collar 87 will have its elongated slot 88 in such angular relation to its flat side 89 that the length of the slot will extend in a direction that is radial to the axis of rotation of the crank structure. The adjusting screw 72 together with the plate cutout 61, and also the cutout 62 in plate 59, will preferably be disposed in true radial relation to the axis of rotation of the crank structure. Fig. 5 shows the crank pin devices with their centers in a mean position of adjustment represented by the broken line arcs M in Figs. 8 and 9 while Fig. 9 represents the effective throw of the crank reduced to the diameter of arc R, and Fig. 8 represents the effective throw of the crank increased to the diameter of arc I. For ordinary purposes the yoke and its bifurcate ends will be so shaped and disposed that both of the adjustable crank pin devices 79, 87 have their centers positioned at the same distance from the axis of rotation at a given time.

For enabling an operative in charge of calibrating meters to know how much the adjusting screw 72 should be turned in order to effect, upon first trial, a satisfactory correction of an observed error in calibration, it is convenient to proportion, shape and arrange the parts in Fig. 5 so that one full turn of screw 72 varies the displacement of the diaphragms to such an extent that a change of one per cent is effected in the volume of gas passed through the meter corresponding to a given amount of register movement. Because the amount of gas taken into and discharged from all three measuring chambers, instead of only two measuring chambers, is varied by adjusting the single screw 72, a fine control of the crank pin adjustive movement is desirable. Where each of angles A and B equals 40 degrees, and each of angles C and D equals 50 degrees, the straight edges of the bifurcate yoke ends 70 and 71 will fall perpendicular to lines radial to the axis of rotation of the crank structure, along which lines the adjustable crank pin devices 87 and 79 are free to be shifted. Figs. 8 and 9 show the inner straight edges of yoke ends 70 and 71 which engage with crank pin devices 87 and 79 disposed and maintained truly perpendicular to radial lines intersecting at the axis of rotation X and passing through the centers of post 57 and crank pin 79, respectively, and also show the slot 88 elongated in true alignment with the radial line passing through axis X and the center of post 57, and also show like distances from axis X to the center of each of parts 99 and 79. The control of adjustment of these crank pin devices will become finer as the angles C and D are reduced, while preferably maintained alike, until as it will be seen, no adjustment whatever would be effected should angles C and D be made zero. Where coarser adjustment is preferred, angles C and D may be increased, while preferably maintained alike. Angles A and/or B may also be increased or decreased, for the usual purposes being maintained alike. It will be observed that the friction with which the plate 59 is clamped between the head-flanges 78 and 82 by the force of spring 84 exerts a holding power opposing accidental disturbance of designed adjustment of crank pin 79 which holding power is transmitted through the yoke 68 to the other shiftable crank-pin device 87. The latter therefore requires no separate means for maintaining the position to which it is adjusted.

It is seen that by these improvements when angle A equals angle B and angle C equals angle D, the effective "throw" of the crank with respect to each of the pitman links and their connected diaphragms may be varied to exactly the same extent by a common means of adjustment. This will enable the performance characteristic of the register to be varied without in any way disturbing the designed timing of the valve action in relation to the diaphragm movements. Such disturbance could in small extent result from the former practice of varying the throw of the crank in relation to one diaphragm while leaving the throw of the same crank constant in relation to the other diaphragm.

The novel principles underlying the present improvements may be seized upon and embodied in constructions and relationships of parts different from those herein chosen for the purpose of illustrating the invention, and the appended claims are intended to cover all substitutes and equivalents suggested by the disclosure hereof or which come within the fair meaning of their terms.

I claim:

1. In gas metering apparatus, mechanism for transmitting variable ratios of movement between two diaphragms and a rotary shaft, including diaphragm-connected pitman links, a crank structure rotatable about a fixed axis, a crank pin fixedly carried by said structure, and two crank pin devices respectively engaged by said pitman links and carried by said crank structure in adjustable relation thereto, together with common means constructed and arranged to move both of said crank pin devices relative to said crank structure.

2. In variable leverage crank mechanism the combination with pitman links, of a shaft, a composition crank rotor including a crank arm rigidly carried on the end portion of said shaft, a plate axially spaced from said arm, and a post fixedly connecting said arm and plate, together with a plurality of crank pin devices supported on said rotor for adjustive movement to different distances of eccentricity in relation to said post and engaged respectively by said pitman links, one of said crank pin devices and one of said links being located between said supporting arm and said plate, together with means to hold said devices on said crank rotor at definite radial distances from said shaft.

3. In variable leverage crank mechanism, the combination defined in claim 2, in which the said plate has two cutouts elongated in relatively inclined directions to afford guideways, one of said guideways being constructed and arranged to define the path of adjustive movement of one of said crank pin devices, and an adjustor comprising a flat sided block occupying and restricted to movement lengthwise of the other of said guideways, together with a member constructed to be assembled in selective angular relations to the flat sides of said block constructed and arranged to move both of said crank pin devices to their said different positions.

4. In combination, a crank plate having a pivotal axis, a crank pin device carried by said plate in slidable relation thereto, means to constrain said device to a straight path of movement radial to said axis, a second crank pin device carried by said plate in slidable relation thereto, means to constrain said second crank pin device to a straight path of movement radial to said axis, an adjustor carried by said plate in slidable relation thereto engaging both of said crank pin devices for slidably moving them in unison relative to said plate, and means to constrain said adjustor to a straight path of movement radial to said axis and intermediate the said paths of movement of said crank pin devices.

5. The combination defined in claim 4, in which the said path of sliding travel of the said adjustor is exactly midway the said paths of travel of the said crank pin devices and in which said adjustor has straight edged bifurcate terminals engaged respectively with the said crank pin devices and inclined in perpendicular relation to the first said two paths of travel thereby always to produce equal amounts of adjustive movement of the said crank pin devices.

6. In a gas meter comprising flexible diaphragms, a shaft to be operatively connected to a valve, a crank arm on said shaft for rotating the same, an adjustment flange, a stud fixed to said crank arm and to said flange, a second stud adjustably connected to said flange, a link connecting said second stud with one of said diaphragms, a yoke on said flange, a link connected at one end with another of said diaphragms, means on the other end of said second link and providing a driving connection between the link and the fixed stud, means for adjusting the yoke on said flange, and said yoke including means whereby as it is adjusted there is a simultaneous adjustment of the second stud relative to the flange and of the driving connection between the second link and the fixed stud.

7. In a gas meter comprising flexible diaphragms, a shaft to be operatively connected with a valve, a crank arm on said shaft for rotating the latter, a stud fixed to said crank arm, a link having a driving connection with said stud and one of said diaphragms, an adjusting flange, a driving connection between said stud and the flange, a second stud having a driving connection with said flange, a link having a driving connection with said second stud and another of said diaphragms, a yoke on said flange, means for adjusting the yoke relative to the flange, and means whereby as the yoke is adjusted relative to the flange there is simultaneous adjustment of said links relative to the shaft.

8. In a gas meter comprising flexible diaphragms, a shaft to be operatively connected with a valve, a crank arm on said shaft for rotating the latter, a stud fixed to said crank arm, a link having a driving connection with said stud and one of said diaphragms, an adjustment flange, said stud being fixed to said flange, a second stud connected to said flange, a link having a driving connection with said second stud and another of said diaphragms, a yoke on said flange, means for adjusting the yoke relative to the flange, and means whereby as said yoke is adjusted it causes simultaneous and substantially equal adjustments of said links relative to the shaft.

9. In a gas meter including flexible diaphragms, a shaft to be operatively connected to a valve, a crank arm on said shaft for rotating the same, an adjustment flange, a stud fixed to said crank arm and to said flange, said flange having a forked portion, a block slidable in said fork, a pin carried by said block, a link connecting the pin with one of said diaphragms, a yoke on said flange and having a pair of forks arranged at approximately 100° to one another, said pin entering one of said forks, a block having a slot receiving said fixed stud, a link having a looped end about said slotted block and connected at its other end to another of the diaphragms, said slotted block having portions engaged by the other fork of said yoke, and means for adjusting the yoke on the flange whereby to move the pin and the first block and the slotted block relative to the flange to simultaneously and equally adjust said links.

10. In a gas meter including flexible diaphragms, a shaft to be operatively connected with a valve, a crank arm on said shaft for rotating the same, an adjustment flange, a stud fixed to said crank arm and to said flange, said flange having a fork, a block slidable in said fork, a pin carried by said block, a link connecting the pin with one of said diaphragms, a yoke on said flange and having a pair of forks arranged at approximately 100° to one another, said pin entering one of the forks in the yoke, a block having a slot receiving said fixed stud, a link having a looped end about said slotted block and connected at its other end to another of said diaphragms, said slotted block having portions engaged by the other fork of said yoke, an adjusting screw on said flange, a nut connecting the screw with the yoke whereby as the screw is rotated the yoke is moved relative to the flange to shift the pin and the first block and the slotted block relative to the flange to simultaneously adjust said links.

11. In a gas meter comprising flexible diaphragms, a shaft to be operatively connected with a valve, a crank arm on said shaft for rotating the latter, a stud fixed to said crank arm, a link having a driving connection with said stud and one of said diaphragms, an adjusting flange, a driving connection between said stud and the flange, a second stud having a driving connection with said flange, a link having a driving connection with said second stud and another of said diaphragms, and a single means on said flange for simultaneously adjusting both links relative to the first stud.

12. In a gas meter including flexible diaphragms, a shaft to be operatively connected to a valve, a crank arm on said shaft for rotating the same, an adjustment flange, a stud fixed to said crank arm and to said flange, said flange having a guide, a block slidable in said guide, a link pivotally connected with said block and with one of the diaphragms, a yoke on said flange and having a pair of guides arranged at an angle to each other, said block being slidably connected with one of said guides on the yoke, a second block having a relative laterally movable connection with the stud and having slidable connection with the other guide on the yoke, a link having a pivotal connection with said second block and connected to another of said diaphragms, and means for shifting the yoke on the flange to simultaneously shift the blocks relative to the stud.

13. In a gas meter including flexible diaphragms, a shaft to be operatively connected to a valve, a crank arm on said shaft for rotating the same, an adjustment flange, a stud fixed to said crank arm and to said flange, said flange having a slot, a yoke adjustably mounted on the flange and having a pair of slots arranged at an angle to each other, one of said slots in the yoke extending transversely of the slot in the flange, a block having slidable connection with said slot in the flange and with said transversely extending slot in the yoke, a link connected with said block and with one of said diaphragms, a second block having sliding connection with the other slot in the yoke and having an elongated slot receiving the stud and extending transversely of said second yoke slot, a link connecting said second block with another of said diaphragms, and means for shifting the yoke on the flange to shift said blocks relative to the stud.

14. In a gas meter including flexible diaphragms, a shaft to be operatively connected to a valve, a crank arm on said shaft for rotating the same, an adjustment flange, a stud fixed to said crank arm and to said flange, a yoke adjustably mounted on the flange, a pin having slidable connection with the flange and with the yoke, a link connecting said pin with a diaphragm, a second link connecting the stud with another diaphragm and having sliding connection with the stud and with the yoke, and means for shifting the yoke on the flange to simultaneously adjust the links relative to the stud.

15. The combination with a shaft, of a crank structure mounted on said shaft in a manner to be rotatably adjustable relative thereto having axially spaced crank arm portions joined solely by a crank pin positioned eccentrically of the axis of rotation of said crank structure, said shaft projecting through one of said crank arm portions into the space between said portions, a worm wheel positioned between said portions and fixed on said shaft, and an adjusting worm carried by one of said crank arm portions and in mesh with said worm wheel.

16. In variable leverage crank mechanism, the combination with a shaft, of a crank arm mounted on said shaft in a manner to be rotatably adjustable relative thereto, a plate axially spaced from said arm, a post connecting said arm and plate positioned eccentrically of the axis of said shaft, a crank pin device carried adjustably on said plate in the space separating the latter from said crank arm, a pitman link operatively engaged with said crank pin device within said space, a worm wheel fixed to said shaft in the space separating said plate and crank arm, and an adjusting worm carried by said arm in mesh with said worm wheel.

17. In gas metering apparatus, mechanism for transmitting movement between two diaphragms and a rotary shaft, including diaphragm connected pitman links, a crank structure rotatable about a fixed axis, a crank pin fixedly carried by said structure, and a member having an elongated slot opening therethrough and occupied by said crank pin, said member being carried by said crank structure in eccentrically adjustable relation to said crank pin and having a portion pivotally engaged by one of said pitman links, said portion being positioned to revolve about said axis in a common plane with said fixed crank pin, together with means to hold said member in selective adjusted relationship to said crank pin.

18. In gas metering apparatus, mechanism for transmitting movement between two diaphragms and a rotary shaft, including diaphragm-connected pitman links, a crank structure rotatable about a fixed axis, a crank pin fixedly carried by said structure, and a member formed with a flat side carried by said crank structure in adjustable relation thereto having a rounded portion pivotally engaged by one of said pitman links positioned to revolve about said axis in a common plane with said fixedly carried crank pin, together with a bifurcate device mounted for adjustive movement on said crank structure and engaging said flat side of said member in a manner to hold the latter at various distances from said axis.

19. In gas metering apparatus, mechanism for transmitting movement between two diaphragms and a rotary shaft, including diaphragm-connected pitman links, a crank structure rotatable about a fixed axis, a crank pin fixedly carried by said structure, and a member formed with spaced parallel flat sides carried by said crank structure in adjustable relation thereto having a rounded portion pivotally engaged by one of said pitman links positioned to revolve about said axis in a common plane with said fixedly carried crank pin, together with a bifurcate device mounted for adjustive movement on said crank structure and engaging said flat sides of said member in a manner to hold the latter at various distances from said axis thereby to prevent said member from turning with respect to said crank pin.

20. In gas metering apparatus, mechanism for transmitting movement between two diaphragms and a rotary shaft, including diaphragm-connected pitman links, a crank structure rotatable about a fixed axis, a crank pin fixedly carried by said structure, and a member formed with a flat side carried by said crank structure in adjustable relation thereto having a rounded portion pivotally engaged by one of said pitman links positioned to revolve about said axis in a common plane with said fixedly carried crank pin, together with a bifurcate device mounted for adjustive movement on said crank structure and having a straight edge aligned in guiding contact with said flat side of said member in a manner to prevent the latter from turning with respect to said crank pin.

21. In gas metering apparatus, mechanism for transmitting variable ratios of movement between two diaphragms and a rotary shaft, including diaphragm-connected pitman links, a crank structure rotatable about a fixed axis, a crank pin fixedly carried by said structure, and two crank pin devices respectively engaged by said pitman links and carried by said crank structure in adjustable relation thereto, together with common means constructed and arranged to move both of said crank pin devices relative to said crank structure, said means including a yoke-like member engaged with both of said crank pin devices.

22. In gas metering apparatus, mechanism for transmitting variable ratios of movement between two diaphragms and a rotary shaft, including diaphragm-connected pitman links, a crank structure rotatable about a fixed axis, a crank pin fixedly carried by said structure, and two crank pin devices respectively engaged by said pitman links and carried by said crank structure in adjustable relation thereto, together with common means constructed and arranged to move both of said crank pin devices relative to said crank structure, said means including a member engaged with both of said crank pin devices and mounted on said crank structure in a manner to be shifted between and held in various positions thereon.

23. In a gas meter, a pair of flexible diaphragms, a shaft to be operatively connected with a valve, a crank arm on said shaft for rotating the same, a flange, a stud in eccentric relation to said shaft connecting said flange to said crank arm, a pair of links connected at their ends to the respective diaphragms, plural connections respectively coupling said links pivotally to said flange at respective points spaced apart along the crank path, and a single means on said flange constructed and operatively associated with said connections in a manner to cause simultaneous adjustment of said connections relative to said stud.

24. In a gas meter, a pair of flexible diaphragms, a shaft to be operatively connected with a valve, a crank arm on said shaft for rotating the same, a flange, a stud in eccentric relation to said shaft connecting said flange to said crank arm, a pair of links connected at their ends to the respective diaphragms, a connection pivotally coupling one of said links to said stud, another connection pivotally coupling the other of said links to said flange independently of said stud, and a single means on said flange constructed and operatively associated with said connections in a manner to cause simultaneous adjustment of both of said connections relative to said stud.

25. In variable leverage crank mechanism the combination with pitman links, of a shaft, a supporting arm rigidly carried on the end portion of said shaft, a plate axially spaced from said arm having two guideways elongated in relatively inclined directions, a post connecting said arm and plate, and a plurality of crank pin devices mounted for adjustive movement to different positions relative to said plate and engaged respectively by said pitman links, one of said crank pin devices and one of said links being located between said supporting arm and said plate and one of said guideways being constructed and arranged to define the path of adjustive movement of the other of the said crank pin devices, together with an adjustor restricted to movement lengthwise of the other of said guideways constructed and arranged to shift the last said crank pin device to its said different position and hold it therein.

26. In variable leverage crank mechanism, the combination defined in claim 25, in which the said adjustor is constructed and arranged to move the said one of the said crank pin devices to its said different positions and hold it therein.

27. The combination with a shaft rotatable upon its axis for transmitting movement to a meter register, of crank structure mounted on said shaft in a manner to be adjustable about said axis relative to said shaft, said structure including crank arm portions and a crank pin rigidly connecting said portions in spaced relationship at a point eccentric to said shaft axis, the said shaft projecting through the nearer of said spaced crank arm portions into the space between said portions and the said nearer crank arm portion including a hub fixed on said shaft with branch lugs carried by said hub offset therefrom toward said space, together with a worm wheel fixed on said shaft in a common transaxial plane with said lugs, and an adjusting worm in mesh with said worm wheel journaled in at least one of said lugs.

28. A gas meter including in combination with a casing having a restricted opening for inserting a tool through the wall thereof, two gas operated diaphragms, a crank having two adjustable crank pin devices respectively coupled to said diaphragms, a shaft carrying said crank, a single means constructed and connected to adjust both of said crank pin devices relative to the crank including a tool receptive element carried by said crank to turn on an axis directable toward said casing opening, and additional means carried by said crank constructed and arranged to adjust said crank relative to said shaft including another tool receptive element turnable on a different axis inclined in relation to the first said axis thereby to be directable toward said casing opening simultaneously with the first said element whereby both of said elements may simultaneously be positioned to be reached by a tool extending in coaxial alignment with each of said elements when inserted through said casing opening.

29. A gas meter having a register and including in combination, two spaced parallelly related gas operated diaphragms, a register driving double crank rotor mounted to turn about a fixed axis, pitman links, hinge joints connecting said links to said diaphragms, and pivotal couplings respectively connecting said pitman links to said rotor in a manner to determine centers of swinging movement of said links relative thereto spaced apart along the crank path, each of said couplings being constructed and arranged to permit variation in the distance separating said spaced centers from each other along the crank path and simultaneously to permit variation in the radial distance separating each of said spaced centers from said axis, and means constructed and arranged to maintain constant the crank angle by which one of said spaced centers remains rotatively advanced in relation to the other of said spaced centers in all possible positions of said couplings relative to said crank rotor.

30. A gas meter having a register and including in combination, gas operated diaphragms, a register-driving double crank rotor mounted to turn about a fixed axis, pitman links respectively connected to both of said diaphragms, coupling devices connecting said pitman links pivotally to said rotor at points spaced apart along the crank path and mounted on said rotor in a manner permitting said devices to be shifted simultaneously toward and away from said axis, and means constraining said devices to shifting movement respectively in diverging paths radially directed with respect to said axis.

31. In gas metering apparatus, mechanism for transmitting reciprocative movement of a gas motivated diaphragm into variable speeds of travel of a rotary shaft, including in combination, a crank arm rotatable about a fixed axis, a crank pin fixedly carried by said arm, a collar carried by said arm in adjustable relation to said crank pin containing an elongated slot occupied by said pin affording slidable adjustability of said collar to different eccentric positions relative to said pin, and a pitman link connected at one end to said diaphragm and having its opposite end portion pivotally engaged with said collar and surrounding the said elongated slot therein.

32. In gas metering apparatus, mechanism for transmitting reciprocative movements of a gas motivated diaphragm into variable speeds of travel of a rotary shaft, including in combination, a crank arm rotatable about a fixed axis, a crank pin carried in fixed position on said arm, a member carried by said arm in adjustable engagement with said crank pin having a flat side face and a rounded portion, a pitman link connected at one end to said diaphragm and having its opposite end portion pivotally engaged with said rounded portion of said member, and guide means carried by said arm having operative engagement with said flat side face of said member thereby to restrict the direction of adjustive movement of said member relative to said crank pin.

33. In gas metering apparatus, mechanism for transmitting variable ratios of movement between two diaphragms and a rotary shaft, including diaphragm-connected pitman links, a crank structure having axially spaced crank arms rotatable about a common fixed crank axis, a crank pin spaced at an invariable radial distance from said axis fixedly holding said arms together in rigid relation, and two crank pin devices carried by said crank structure respectively engaged by said pitman links, one of said devices being positioned between said arms in eccentrically adjustable relation to said crank pin, together with means to hold said devices on said crank structure at definite radial distances from said crank axis.

34. In gas metering apparatus, the combination with mechanism as defined in claim 33, of a rotary shaft fixedly carrying one of the said crank arms, and relatively movable connections located between said arms constructed and arranged to hold said crank structure in selective rotative positions in rigid relation to said shaft.

35. In gas metering apparatus, the combination with mechanism as defined in claim 33, of a rotary shaft fixedly carrying one of the said crank arms, and connections located between said arms including a worm and worm wheel constructed and arranged to hold said crank structure in selective rotative positions in rigid relation to said shaft.

36. In gas metering apparatus, the combination with mechanism as defined in claim 33, of a rotary shaft fixedly carrying one of the said crank arms, and connections located between said arms including a worm wheel fixed to said shaft and a worm in mesh with said wheel carried by the said crank structure, said connections being constructed and arranged to hold said crank structure in selective rotative positions in rigid relation to said shaft.

37. In gas metering apparatus mechanism for transmitting movement between two gas motivated diaphragms, including in combination, a meter register, a shaft rotatable about a fixed axis and operatively associated at one end with said register, diaphragm connected pitman links located at the other end of said shaft, a crank structure fixed to said other end of the shaft, a crank pin fixedly carried by said structure, and a crank pin device carried by said crank structure encompassing said crank pin in eccentrically adjustable relation thereto and having a portion pivotally engaged by one of said pitman links, said portion being positioned to revolve about said axis in a common plane with said fixed crank pin, together with means to hold said device on said crank structure at selective radial distances from said shaft.

38. In a gas meter, a pair of flexible diaphragms, a shaft to be operatively associated with a valve, a double crank having axially spaced webs, an arm on said shaft comprising one of said webs, a flange comprising the other of said webs, a stud fixedly connecting said webs in rigid relation, a pair of links connected at their ends to the respective diaphragms, plural connections respectively coupling said links pivotally to said flange at points spaced angularly from each other in the crank path, and a single means on said double crank operable to vary the radial distance of all of said connections from the shaft.

39. In a gas meter, a pair of flexible diaphragms, a shaft to be operatively associated with a valve, a crank arm on said shaft for rotating the same, a flange, a stud connecting said flange to said crank arm, a pair of links connected at their ends to the respective diaphragms, connections pivotally coupling said links to said flange at points spaced angularly in the direction of flange rotation, and a single means on said flange operable to cause simultaneous adjustments of said connections relative to the stud.

40. In combination, a frame bearing, a shaft journaled in said frame bearing having a terminal portion projecting therefrom, a crank arm having a hub portion mounted on said shaft closely adjacent said frame bearing in a manner to be adjustable in rotative relation thereto and further having at least one lug axially offset from said hub portion, a worm wheel of larger diameter than said shaft fixedly mounted on said terminal portion of the shaft adjacent said crank arm at the opposite side thereof from said frame bearing, and a worm in mesh with said worm wheel rotatably supported by said lug.

41. A gas meter having a register and including, in combination, at least two spaced parallelly related gas motivated diaphragms having substantially co-axial reciprocative central portions, a register driving double crank rotor having a fixed axis of rotation, two connector links, a pivotal joint limiting each of said links to swinging movement centered at said central portion of a different one of said diaphragms, additional pivotal joints connecting the opposite ends of said links respectively to said rotor in a manner to determine spaced centers of swinging movement of said links relative to said rotor, adjustable means constructed and arranged to shift said additional pivotal joints to different positions relative to said rotor such that the distance of each of said spaced centers from said crank axis may thereby be varied, and constraining means cooperative with said pivotal joints to maintain each of said centers in a constant straight line radial to said axis, whereby each of said diaphragms is enabled to push and pull on said crank rotor through the medium of said links with selectively variable leverage and at respective points separated in the crank path by a constant crank angle always equal to the constant spread between said straight radial lines.

42. In a gas meter, a pair of flexible diaphragms, a shaft to be operatively associated with a valve, a crank arm on said shaft for rotating the same, a flange, a stud connecting said flange to said crank arm, a pair of links connected at their ends to the respective diaphragms, connections pivotally coupling said links to said flange at points spaced angularly in the direction of flange rotation, and a single means operable to cause simultaneous adjustments of said connections relative to the stud.

ARTHUR S. McINTIRE.

CERTIFICATE OF CORRECTION.

Patent No. 2,296,476.  September 22, 1942.

ARTHUR S. McINTIRE.

It is hereby certified that error appears in the printed specification of the above numbered patent requiring correction as follows: Page 5, second column, line 15-16, claim 2, for the word "composition" read --composite--; and that the said Letters Patent should be read with this correction therein that the same may conform to the record of the case in the Patent Office.

Signed and sealed this 17th day of November, A. D. 1942.

(Seal)

Henry Van Arsdale,
Acting Commissioner of Patents.